(12) United States Patent
Danjo et al.

(10) Patent No.: US 8,598,826 B2
(45) Date of Patent: Dec. 3, 2013

(54) ELECTRIC MOTOR CONTROL SYSTEM

(75) Inventors: Yasuyuki Danjo, Saitama (JP); Naoki Imai, Saitama (JP); Yuji Fujita, Saitama (JP); Fumio Anraku, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 13/139,353

(22) PCT Filed: Nov. 2, 2009

(86) PCT No.: PCT/JP2009/068784
§ 371 (c)(1),
(2), (4) Date: Jun. 13, 2011

(87) PCT Pub. No.: WO2010/073819
PCT Pub. Date: Jul. 1, 2010

(65) Prior Publication Data
US 2011/0241589 A1    Oct. 6, 2011

(30) Foreign Application Priority Data
Dec. 26, 2008  (JP) ............... P.2008-333639

(51) Int. Cl.
*H02P 7/00*    (2006.01)

(52) U.S. Cl.
USPC ............. 318/453; 318/504; 318/400.02

(58) Field of Classification Search
USPC .......... 318/504, 400.02, 400.03, 400.13, 443, 318/400.21, 400.22, 453
See application file for complete search history.

(56) References Cited

U.S. PATENT DOCUMENTS

| | | | |
|---|---|---|---|
| 5,998,880 A * | 12/1999 | Kumar | 290/40 B |
| 6,683,435 B1 | 1/2004 | Liang et al. | |
| 7,236,337 B2 * | 6/2007 | Minatani | 361/23 |
| 7,276,871 B2 * | 10/2007 | Ganev et al. | 318/434 |
| 2007/0093359 A1 * | 4/2007 | Kobayashi et al. | 477/107 |
| 2007/0249461 A1 | 10/2007 | Tsuji et al. | |
| 2009/0251831 A1 | 10/2009 | Shiba et al. | |
| 2010/0036555 A1 * | 2/2010 | Hosoda et al. | 701/22 |

FOREIGN PATENT DOCUMENTS

| | | |
|---|---|---|
| JP | 7-59384 A | 3/1995 |
| JP | 2006-184160 A | 7/2006 |
| JP | 2007-118680 A | 5/2007 |
| JP | 2007-312588 A | 11/2007 |
| JP | 2008-011683 A | 1/2008 |
| JP | 2008-220045 A | 9/2008 |
| WO | WO 2008/001949 A1 | 1/2008 |
| WO | WO 2008/108159 A1 | 9/2008 |

* cited by examiner

*Primary Examiner* — Eduardo Colon Santana
*Assistant Examiner* — Iftekhar Mustafa
(74) *Attorney, Agent, or Firm* — Arent Fox LLP

(57) ABSTRACT

There is provided a control system for an electric motor to which electric power is supplied from a DC power supply via a multi-phase inverter, the multi-phase inverter including switch units respectively provided on a positive side and a negative side of arms corresponding to respective phases, each switch unit including a switching element and a reflux diode connected in parallel thereto. The control system comprises a phase current detection unit for detecting phase currents which flow between the inverter and the electric motor, a DC component acquiring unit for acquiring DC components of the respective phase currents, and a short-circuiting determination unit for determining that a short-circuit failure occurs in the inverter when at least one of the DC components of the phase currents acquired by the DC component acquiring unit exceeds a threshold. Consequently, the short-circuit failure of the inverter can be detected even though the control of the electric motor is stopped.

3 Claims, 16 Drawing Sheets

ELECTRIC MOTOR CONTROL SYSTEM

CROSS-REFERENCED TO RELATED APPLICATION

This application is a National Stage entry of International Application No. PCT/JP2009/068784, filed Nov. 2, 2009, which claims priority Japanese Patet Application No. P.2008-333639, filed Dec. 26, 2008, the duty of disclosure of the prior application in its entirety by reference.

TECHNICAL FIELD

The present invention relates to a control system for an electric motor to which electric power is supplied from a DC power supply via a multi-phase inverter in which a switch unit including a switching element and a reflux diode connected in parallel to the switching element is provided on each of a positive side and a negative side of each of arms of respective phases.

BACKGROUND ART

An HEV (Hybrid Electrical Vehicle) runs on driving force from an internal combustion engine and/or an electric motor. FIG. 14 is a block diagram of an internal configuration of the HEV. In the HEV (hereinafter, referred to simply as the "vehicle") shown in FIG. 14, driving force from an internal combustion engine (ENG) 107 and/or an electric motor (MOT) 101 is transmitted to drive wheels 153 via a gearbox 109 and a drive shaft 151. In the vehicle shown in FIG. 14, a rotor of the electric motor 101 is connected directly to a drive shaft of the internal combustion engine 107. Thus, when the internal combustion engine 107 runs, the rotor of the electric motor 101 also rotates.

The internal combustion engine 107 generates a driving force (an output torque) to run the vehicle. An engine ECU (ENG ECU) 117 controls the internal combustion engine 107. The electric motor 101 is a three-phase AC motor, for example, and generates a driving force (an output torque) to run the vehicle. A motor ECU (MOT ECU) 119 controls the electric motor 101. A battery (BATT) 103 is a DC power supply and supplies electric power to the electric motor 101 via an inverter 105. The output voltage of the battery 103 is a high voltage (for example, 100 to 200V). The inverter 105 converts a DC current from the battery 103 into three phase AC currents. An inverter ECU (INV ECU) 111 controls the inverter 105.

A clutch 113 interrupts or connects a transmission line of driving force from the internal engine 107 and/or the electric motor 101 to the drive wheels 153 based on an instruction from a management ECU 115. When the clutch 113 is disengaged, the driving force is not transmitted to the drive wheels 153, but the clutch 113 is engaged, the drive force is transmitted to the drive wheel 153. The gearbox 109 is a transmission which converts the driving force from the internal combustion engine 107 and/or the electric motor 101 into a rotational speed and torque at desirable gear ratios for transmission to the drive shaft 151.

The management ECU (MG ECU) 115 controls the internal combustion engine 107, the electric motor 101 and the inverter 105, instructs the clutch 113 to be engaged or disengaged and instructs the gearbox 109 to change the gear ratios thereof.

FIG. 15 is a block diagram of a driving system installed in the vehicle shown in FIG. 14 for driving the electric motor 101. As shown in FIG. 15, in the inverter 105, arms 1u, 1v, 1w are provided correspondingly with phases (U phase, V phase, W phase) of the electric motor 101, and the arms 1u, 1v, 1w are connected in parallel to a smoothing capacitor C between power supply terminals 2a, 2b. Central points of the respective arms 1u, 1v, 1w are connected to a U-phase armature Au, a V-phase armature Av and a W-phase armature Aw of the electric motor 101, respectively.

A switch unit includes a switching element such as IBGT or MOSFET and a reflux diode connected in parallel to the switching element. Such switch unit is provided on each of a positive side and a negative side on each of the respective arums. For example, for each of the respective arms, a switch unit 5a including a switching element 3a and a reflux diode 4a is provided on a positive side, and a switch unit 5b including a switching element 3b and a reflux diode 4b is provided on a negative side. On each arm, a collector of the positive-side switching element 3a and a cathode of the positive-side reflux diode 4a are connected to the positive-side power supply terminal 2a, and an emitter of the negative-side switching element 3b and an anode of the negative-side reflux diode 4b are connected to the negative-side power supply terminal 2b. A positive terminal of the battery 103 is connected to the positive-side power supply terminal 2a via a contactor SW.

Each switching element is on/off controlled by a control signal from the inverter ECU 111. A gate resistor R is connected to a gate terminal of each switching element, and a control signal from the inverter ECU 111 is inputted into the gate terminal via the gate resistor R.

When a failure is generated in which the resistance value of the gate resistor R is increased, the switching speed of the switching element becomes slow, and the switching loss is increased, whereby the temperature of the switching element is increased. As a result, a thermal runaway occurs in the switching element which may result in a short-circuit failure. Further, when the inverter 105 including the short-circuited switching element is continuously used, a greater current than the normal current flows, and therefore, the electric motor 101 or three-phase wires may fail. Consequently, in Patent Document 1, in order to prevent the occurrence of malfunction or trouble in the electric motor 101 or three-phase wires when a short-circuit failure occurs in the inverter 105, a greater current is prevented from flowing to the inverter 105.

For example, in Patent Document 1, when the switching element of the switching portion 5b to which a U-phase current flows short-circuits to fail, the inverter ECU 111 on controls the switching elements of the switching portions 5b which are provided on the negative side and off controls the switching elements of the switch units 5a which are provided on the positive side. Consequently, there is produced a state in which inverter 105 side ends of the armatures Au, Av, Aw of the respective phases of the electric motor 101 are substantially short-circuited relative to each other. Hereinafter, this state will be referred to as a "three-phase short-circuited state." And, a control to generate the three-phase short-circuited state in the electric motor 101 will be referred to as a "three-phase short-circuiting control." FIG. 16 shows examples of waveforms of the respective phases which are generated when the rotor of the electric motor 101 which is in the three-phase short-circuited state is rotated by driving the internal combustion engine 107.

RELATED ART DOCUMENT

Patent Document Art
  Patent Document 1: JP-2008-220045-A

SUMMARY OF THE INVENTION

Problem that the Invention is to Solve

When the electric motor 101 runs, the inverter ECU 222 PWM controls the inverter 105 so that the two switching elements 3a, 3b of each arm are not put in an ON state (an energized state) simultaneously. When any of the switch units short-circuits and fails, both the switch units 5a, 5b of the arm including the short-circuited switch unit are energized simultaneously. While the electric motor 101 is in operation, electric power is supplied from the battery 103 and is received by the electric motor 101. Consequently, a great current (a short-circuit current) flows to both the switch units 5a, 5b of the arm including the short-circuited switch unit. In Patent Document 1, during the operation of the electric motor 101, when the positive-side switch unit 5a and the negative-side switch unit 5b of the arm corresponding to any of the phases of the inverter 105 are energized simultaneously, the short-circuit failure of the inverter 105 is detected.

In the vehicle shown in FIG. 14, the motor ECU 119 may not control the electric motor 101 at all when the vehicle runs only on the driving force from the internal combustion engine 107. As this occurs, the inverter ECU 111 off controls all the switching elements and opens the contactor SW provided between the battery 103 and the positive-side power supply terminal 2a. In this state, both the switch units 5a, 5b of the arm corresponding to any of the phases are not energized simultaneously. Therefore, in this state, the short-circuit failure of the inverter 105 is not detected by the short-circuit detection function possessed by Patent Document 1. When he short-circuit failure is not detected although the inverter 105 is failed due to short-circuit, the inverter ECU 111 does not execute the three-phase short-circuiting control, and therefore, a malfunction or failure is eventually generated in the electric motor 101 or the three-phase wires.

An object of the invention is to provide a control system for an electric motor which can detect a short-circuit failure of the inverter even when the control of the electric motor is stopped.

Means for Solving the Problem

Claim 1 provides a control system for an electric motor (for example, an electric motor 101 in an embodiment) to which electric power is supplied from a DC power supply (for example, a battery 103 in the embodiment) via a multi-phase inverter (for example, an inverters 201, 203 in the embodiment), the multi-phase inverter including switch units (for example, switch units 5a, 5b in the embodiment) respectively provided on a positive side and a negative side of arms corresponding to respective phases (for example, arms 1u, 1v, 1w in the embodiment), each switch unit including a switching element (for example, switching elements 3a, 3b) and a reflux diode (for example, reflux diodes 4a, 4b in the embodiment) connected in parallel thereto, comprising:

a phase current detection unit (for example, a phase current sensor 401 in the embodiment) for detecting phase currents which flow between the inverter and the electric motor;

a DC component acquiring unit (for example, a DC component acquiring unit 501 in the embodiment) for acquiring DC components of the respective phase currents; and a short-circuiting determination unit (for example, a short-circuiting determination unit 503 in the embodiment) for determining that a short-circuit failure occurs in the inverter when at least one of the DC components of the phase currents acquired by the DC component acquiring unit exceeds a threshold.

Claim 2 provides the system, based on Claim 1, further comprising:

a switch control unit (for example, a three-phase short-circuiting control unit 505) for on controlling all of switching elements provided on either of the positive side and the negative side and off controlling all of switching elements provided on the opposite side, among the switching elements included in the inverter.

Claim 3 provides the system, based on Claim 2, further comprising:

a current detection unit (for example, current detection units Seu, Sev, Sew, Se in the embodiment) for detecting a current which flows to the two switching elements provided on the positive side and the negative side of each phase, wherein, when a current value detected by the current detection unit is equal to or larger than a threshold, the switch control unit off controls all the switching elements of the on-controlled side and on controls all the switching elements of the off-controlled side.

Claim 4 provides the system, based on Claim 2, further comprising:

a short-circuiting side determination unit (for example, a short-circuiting side determination unit 507 in the embodiment) for determining a side where the short-circuit failure of the switch unit occurs based on polarities of phase currents by a back electromotive force generated in the electric motor when all the switching elements included in the inverter are off controlled, wherein the switch control unit on controls all the switching elements provided on the side determined by the short-circuiting side determination unit and off controls all the switching elements provided on the opposite side.

Claim 5 provides a control system for an electric motor (for example, an electric motor 101 in an embodiment) to which electric power is supplied from a DC power supply (for example, a battery 103 in the embodiment) via a three-phase inverter (for example, an inverters 201, 203 in the embodiment), the three-phase inverter including switch units (for example, switch units 5a, 5b in the embodiment) respectively provided on a positive side and a negative side of arms corresponding to respective phases (for example, arms 1u, 1v, 1w in the embodiment), each switch unit including a switching element (for example, switching elements 3a, 3b) and a reflux diode (for example, reflux diodes 4a, 4b in the embodiment) connected in parallel thereto, comprising:

a phase current detection unit (for example, a phase current sensor 401 in the embodiment) including three sensors for detecting phase currents which flow between the inverter and the electric motor;

a DC component acquiring unit (for example, a DC component acquiring unit 501 in the embodiment) for acquiring DC components of the respective phase currents and a short-circuiting determination unit (for example, a short-circuiting determination unit 503 in the embodiment) for determining that a short-circuit failure occurs in the inverter when at least two of the DC components of the three phase currents acquired by the DC component acquiring unit exceeds a threshold.

Claim 6 provides the system, based on Claim 5, wherein the short-circuiting determination unit determines that the short-circuit failure occurs in the inverter when all the DC components of the three phase currents exceed the threshold, and determines not only that the short-circuit failure occurs in the inverter but also that one of the sensors making up the phase current detection unit fails when two of the DC components of the three phase currents exceed the threshold.

Claim 7 provides the system, based on Claim 5, further comprising:

a switch control unit for on controlling all of switching elements provided on either of the positive side and the negative side and off controlling all of switching elements provided on the opposite side, among the switching elements included in the inverter.

Claim 8 provides the system, based on Claim 7, further comprising:

a current detection unit for detecting a current which flows to the two switching elements provided on the positive side and the negative side of each phase, wherein, when a current value detected by the current detection unit is equal to or larger than a threshold, the switch control unit off controls all the switching elements of the on-controlled side and on controls all the switching elements of the off-controlled side.

Advantage of the Invention

According to the electric motor control systems of Claims 1 to 8, the short-circuit failure of the inverter can be detected even though the control of the electric motor is stopped.

According to the electric motor control systems of Claims 2 to 4 and 7 to 8, the electric motor can be controlled based on three-phase short-circuiting control.

According to the electric motor control systems of Claims 3, 4 and 8, the electric motor can be controlled based on three-phase short-circuiting control while preventing a great current from flowing to the switch unit which short-circuits and fails.

According to the electric motor control system of Claim 6, the short-circuit failure of the inverter can be detected in an ensured fashion.

MODE FOR CARRYING OUT THE INVENTION

Hereinafter, embodiment of the invention will be described by reference to the drawings.

An HEV (Hybrid Electrical Vehicle) runs on driving force of an internal combustion engine and/or an electric motor.

(First Embodiment)

Figure 1:
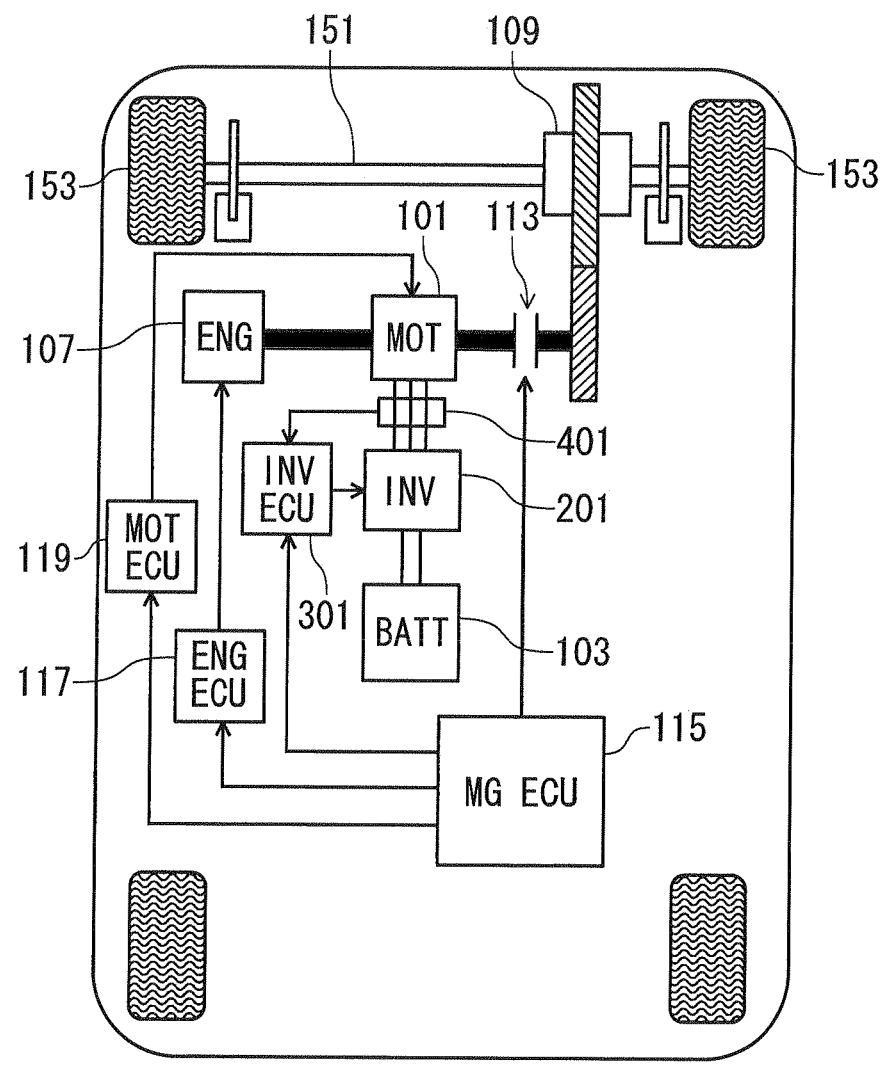
FIG. 1 is a block diagram showing an internal configuration of an HEV equipped with an electric motor control system according to the invention.

FIG. 1 is a block diagram showing an internal configuration of an HEV equipped with an electric motor control system according to the invention. An HEV (hereinafter, referred to simply as a "vehicle") shown in FIG. 1 includes an electric motor (MOT) 101, a battery (BATT) 103, an inverter (INV) 201, an internal combustion engine (ENG) 107, a management ECU (MG ECU) 115, an engine ECU (ENG ECU) 301, a phase current sensor 401, a clutch 113, a gearbox 109, a drive shaft 151, and drive wheels 153. The constituent elements other than the inverter 201, the inverter ECU 301 and the phase current sensor 401 are the same as the corresponding constituent elements in the vehicle shown in FIG. 14. Thus, in FIG. 1, like reference numerals are given to the constituent elements common to those shown in FIG. 14.

Figure 14:
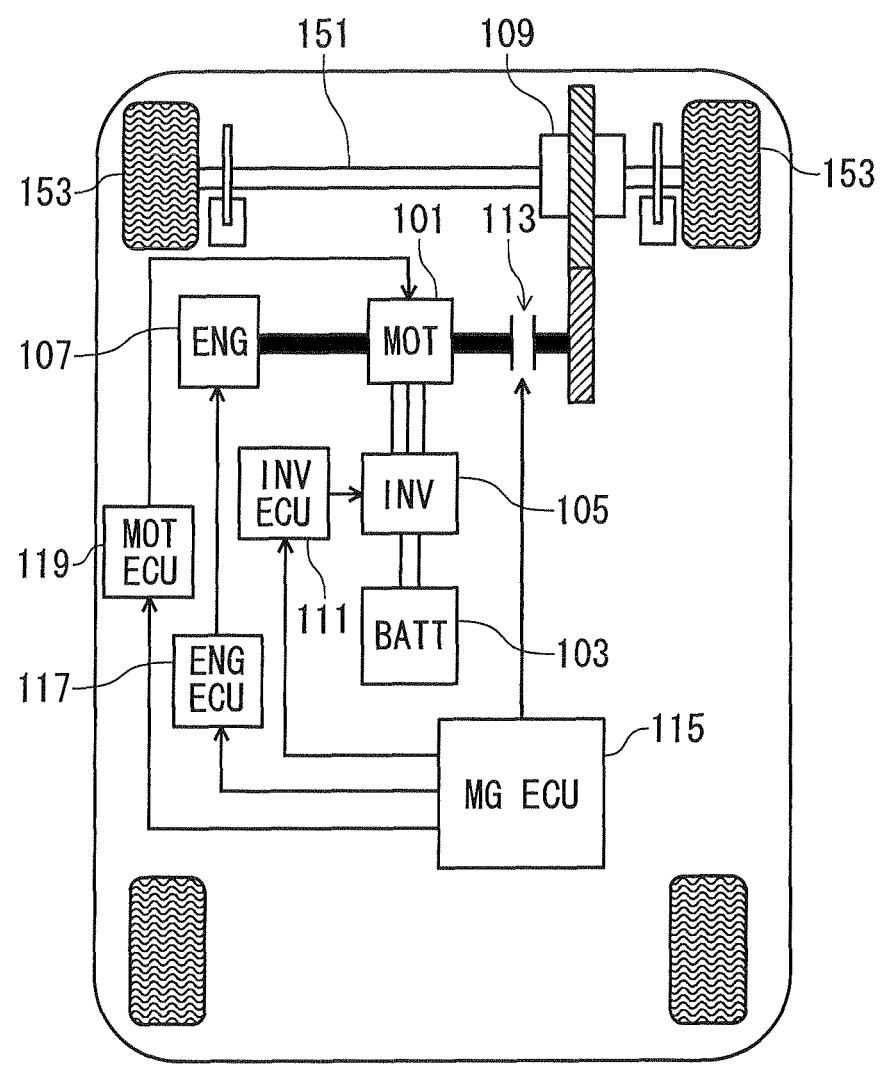
FIG. 14 is a block diagram showing an internal configuration of an HEV.

In the vehicle shown in FIG. 1, as the vehicle shown in FIG. 14, a driving force from the internal combustion engine 107 and/or the electric motor 101 is transmitted to the drive wheels 153 via the gearbox 109 and the drive shaft 151. In addition, in the vehicle shown in FIG. 1, a rotor of the electric motor 101 is connected directly to a drive shaft of the internal combustion engine 107. Thus, when the internal combustion engine 107 runs, the rotor of the electric motor 101 also rotates.

Figure 2:
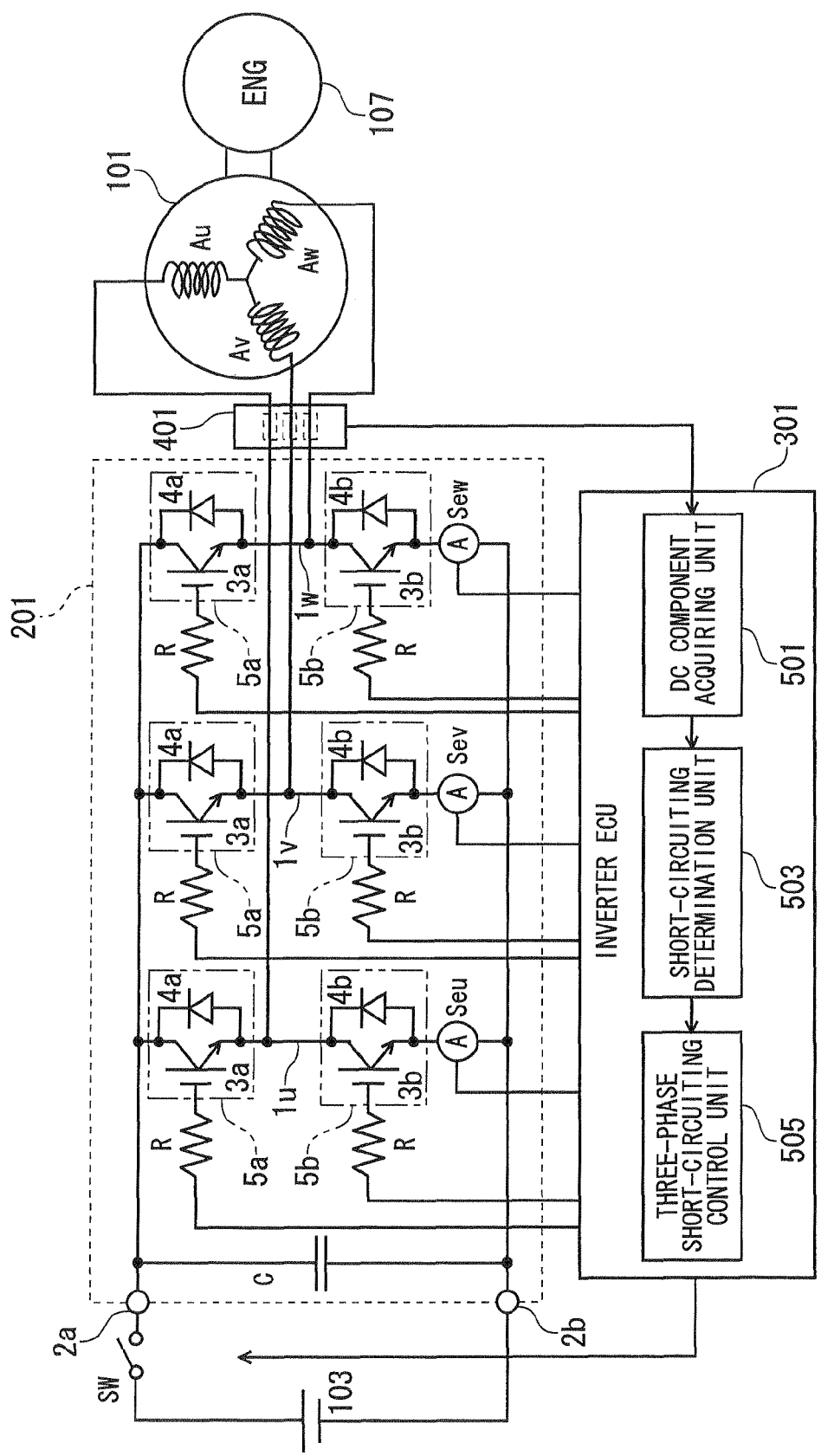
FIG. 2 is a block diagram showing a system for driving an electric motor 101 provided in the vehicle shown in FIG. 1.

FIG. 2 is a block diagram showing a system installed in the vehicle for driving the electric motor 101. The electric motor 101 is a three-phase AC motor, for example. The battery 103 is a DC power supply and supplies electric power to the electric motor 101 via the inverter 201. An output voltage of the battery 103 is a high voltage (for example, 100 to 200V). The inverter 201 converts a DC current from the battery 103 into three-phase AC currents. The inverter 201 has current detection units Seu, Sev, Sew for detecting currents flowing to switching elements 3a and 3b of respective phases. The current detection units Seu, Sev, Sew are provided between a negative-side power supply terminal 2b and respective switch units 5b of the phases. Signal indicating currents detected by the current detection units Seu, Sev, Sew are sent to the inverter ECU 301.

Figure 15:
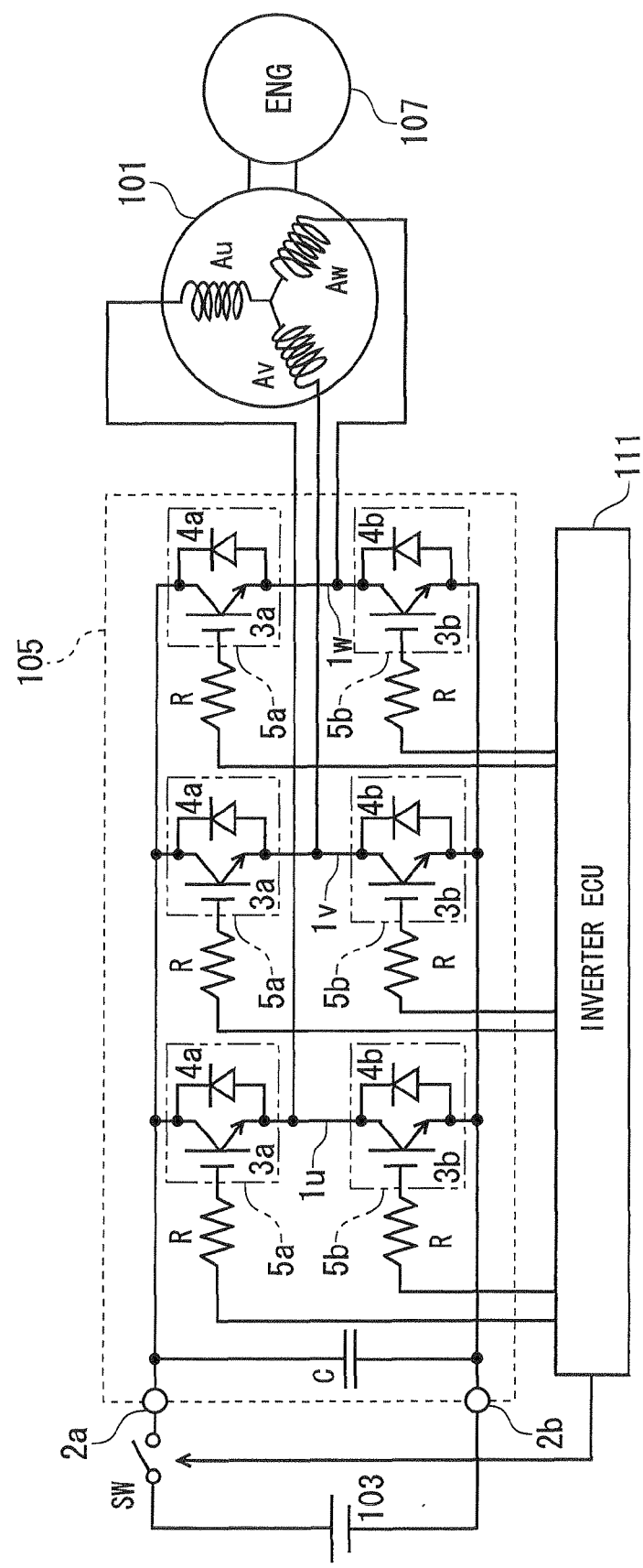
FIG. 15 is a block diagram showing a system for driving an electric motor 101 provided in the vehicle shown in FIG. 14.
Figure 16:
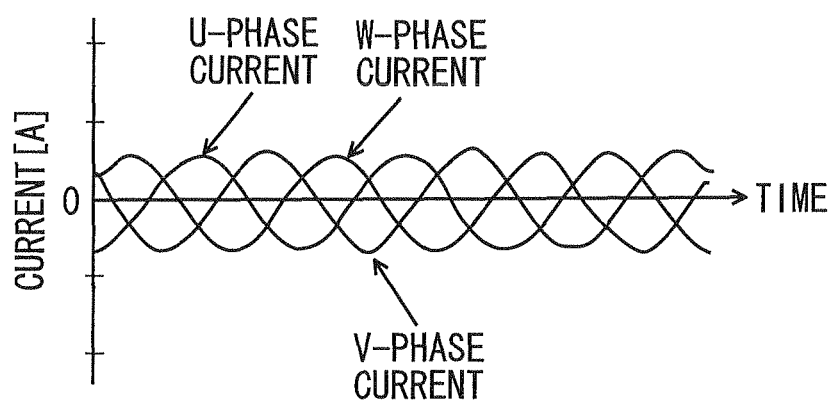
FIG. 16 shows examples of waveforms of phase currents generated when a rotor of an electric motor 101 which is in a three-phase short-circuited state is driven by an internal combustion engine 107.

The inverter ECU 301 controls the inverter 201. As shown in FIG. 2, the inverter ECU 301 of this embodiment has a DC component acquiring unit 501, a short-circuiting determination unit 503 and a three-phase short-circuiting control unit 505. Respective operations of these constituent units will be described in detail later. The phase current sensor 401 includes three sensors for detecting respective phase currents of the electric motor 101. Signals indicating respective phase currents detected by the phase current sensor 401 are sent to the inverter ECU 301. The other constituent elements than the current detection units Seu, Sev, Sew of the inverter 201 shown in FIG. 2, the inverter ECU 301 and the phase current sensor 401 are similar to the corresponding constituent elements shown FIG. 15. Consequently, also in FIG. 2, like reference numerals are given to the constituent elements which are like to those shown in FIG. 15.

Hereinafter, the control of the inverter 201 by the inverter ECU 301 of this embodiment will be described by reference to FIG. 2. When the electric motor 101, which is controlled by the motor ECU 119, is in operation, the inverter ECU 301 PWM controls the inverter 201 so that the two switching elements 3a, 3b of each arm are not put in an ON state (an energized state) simultaneously. When the electric motor 101 is in operation, electric power is supplied from the battery 103 and is received by the electric motor 101. On the other hand, when the control of the electric motor 101 by the motor ECU 119 is not performed at all, the inverter ECU 301 off controls all of switching elements of the inverter 201 and opens a contactor SW.

Next, phase currents (a U-phase current, a V-phase current, a W-phase current) of the electric motor 101 will be described which flow therein when the vehicle shown in FIG. 1 runs only on driving force from the internal combustion engine 107 and the control of the electric motor 101 is not performed at all. As described above, since the rotor of the electric motor 101 is connected directly to the drive shaft of the internal combustion engine 107, when the internal combustion engine 107 runs, the rotor of the electric motor 101 also rotates. As this occurs, a back electromotive force is generated in the electric motor 101.

When the inverter 201 is in a normal state, all of the switching elements of the inverter 201 are controlled to be off by the inverter ECU 301. Consequently, even when a back electromotive force is generated in the electric motor 101 by running the internal combustion engine 107, the phase currents of the electric motor 101 are substantially 0.

Figure 3:
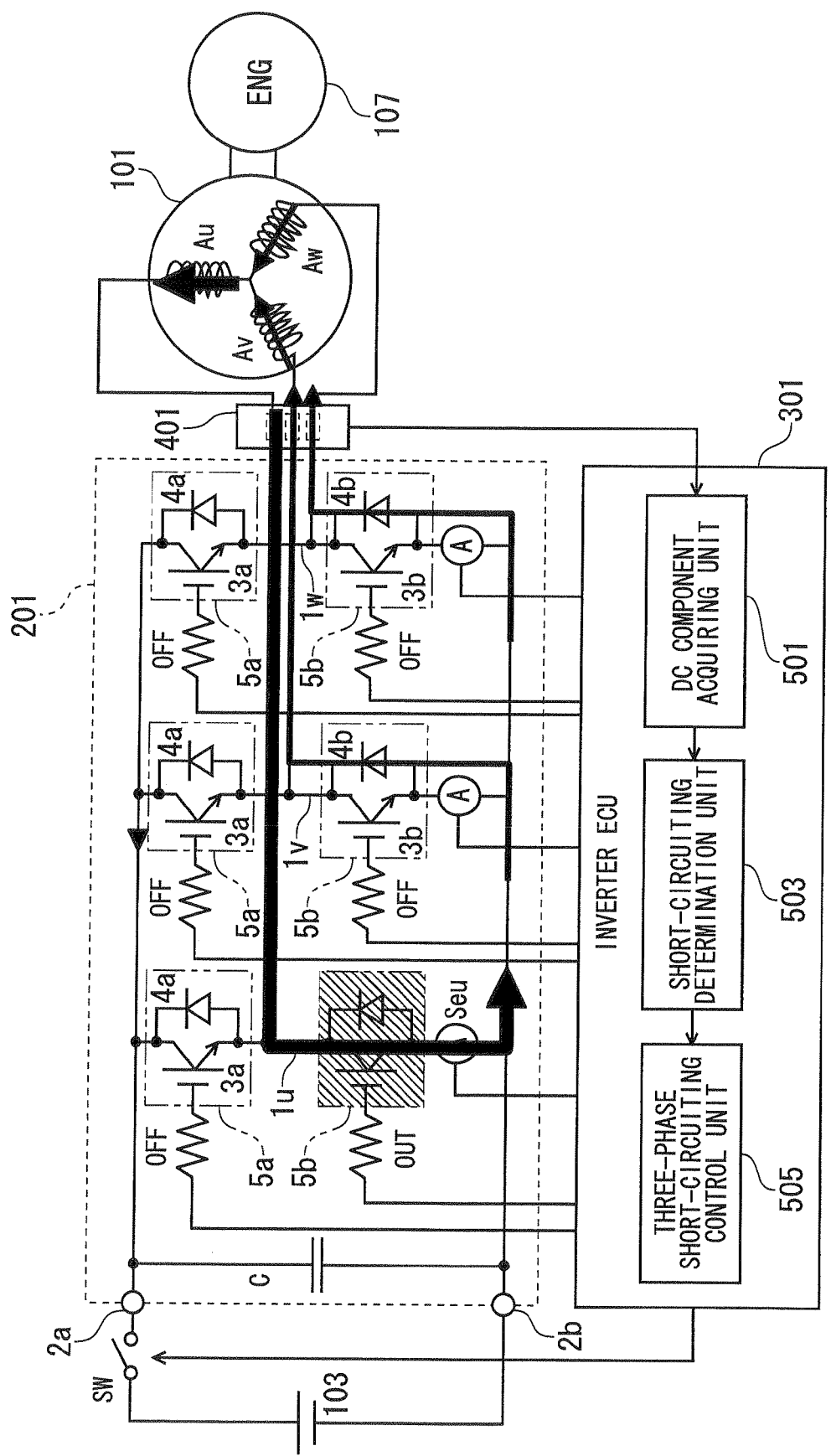
FIG. 3 shows flow lines, directions and magnitudes of respective phase currents which flow in an inverter 201 when a switch unit 5b provided on a negative side of an arm 1u short-circuits and fails while a back electromotive force is being generated in the electric motor 101.
Figure 4:
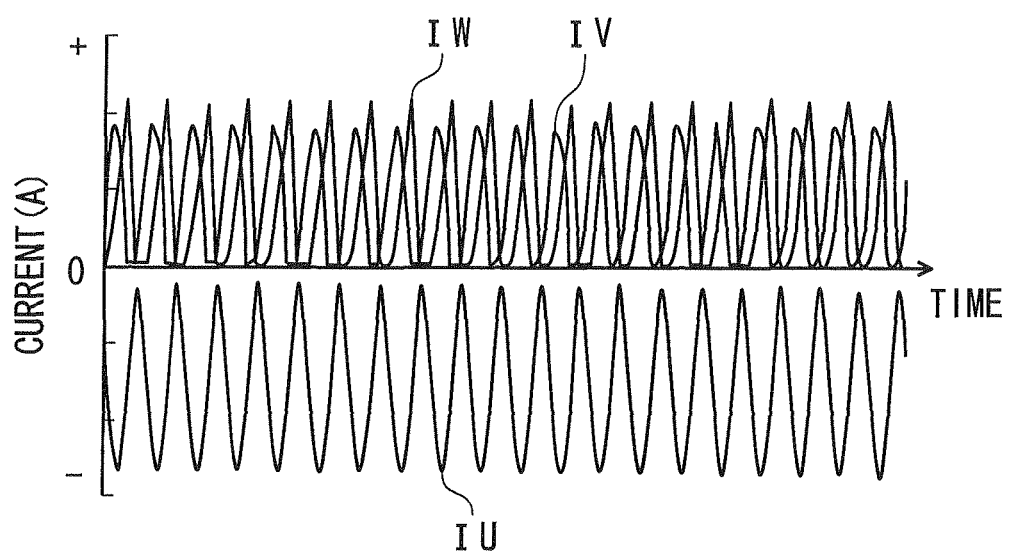
FIG. 4 shows changes of phase currents shown in FIG. 3.

On the other hand, when the inverter 201 short-circuits and fails, the phase currents of the electric motor 101 are not substantially 0. FIG. 3 shows flow lines, directions and magnitudes of phase currents flowing at a certain moment in the inverter 201 when the switch unit 5b provided on the negative side of the arm 1u short-circuits and fails while the back electromotive force is being generated in the electric motor 101. In addition, FIG. 4 shows changes of the phase currents shown in FIG. 3. When the switch unit short-circuits and fails, phase currents flow based on the back electromotive force generated in the electric motor 101. Here, a direction of phase currents from the inverter 201 to the electric motor 101 is referred to as positive, and a direction of phase currents from the electric motor 101 to the inverter 201 is referred to as negative.

As shown in FIGS. 3 and 4, when the switch unit 5b provided on the negative side of the arm 1u short-circuits and fails, a U-phase current IU based on the back electromotive force flows to this switch unit 5b, and a V-phase current IV and a W-phase current IW whose phases are offset through 120 degrees to positive and negative sides, respectively, with respect to the U-phase current IU flow to reflux diodes 4b of the switch units 5b of the other phases. As shown in FIG. 4, a DC component of the U-phase current is offset to an opposite polarity to those of respective DC components of the V-phase current IV and the W-phase current IW.

Figure 5:
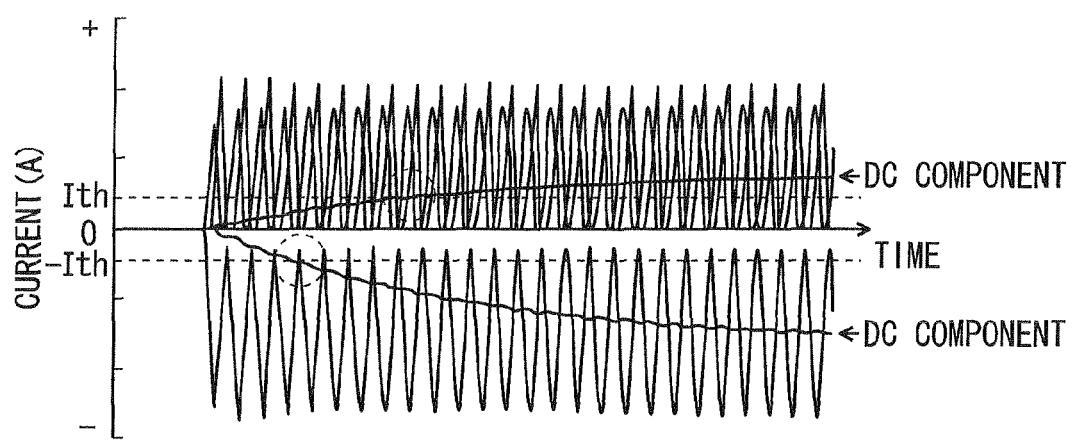
FIG. 5 shows changes of the phase currents shown in FIG. 3 and DC components of the phase currents.

The inverter ECU 301 of this embodiment detects a short-circuit failure of the inverter 201 based on respective characteristics of the phase currents. Signals indicating phase currents detected by the phase current sensor 401 are sent to the inverter ECU 301. The DC components acquiring unit 501 of the inverter ECU 301 acquires respective DC component values of the phase currents. DC components of the phase currents are obtained by calculating a mean value, an effective value or a center value of the phase currents by the inverter ECU 301 or treating the phase currents with a low-pass filter. As shown in FIG. 5, the short-circuiting determination unit 503 of the inverter ECU 301 determines that the inverter 201 short-circuits and fails when at least one of the DC component values exceeds a threshold Ith in absolute value.

Figure 6:
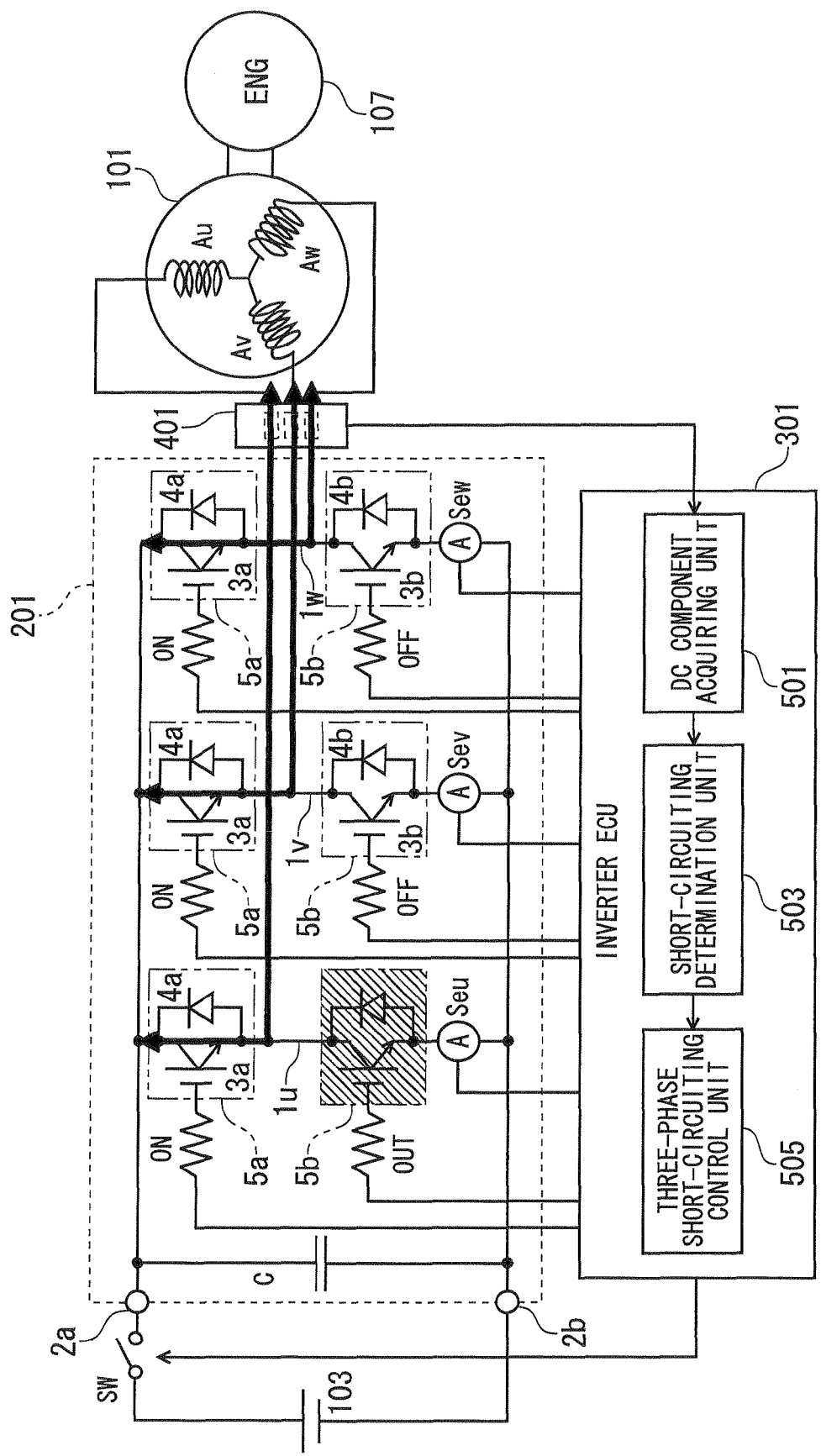
FIG. 6 shows flow lines of the phase currents when all switching elements 3a on a positive side are on controlled with a switch unit 5b on a negative side of a U phase short-circuiting and failing.

After the inverter ECU 301 detects the short-circuit failure of the inverter 201, the phase short-circuiting control unit 505 of the inverter ECU 301 on controls all the switching elements provided on either of the positive side or the negative side of the respective arms and off controls all the switching elements provided on the opposite side. FIG. 6 shows flow lines of the phase currents when all the switching elements 3a on the positive side of the respective arms are on controlled with the switch unit 5b on the negative side of the U phase short-circuits and fails. Since the on-controlled switching elements are energized, the electric motor 101 is put in a three-phase short-circuited state. As a result, when all the currents detected by the current detection units Seu, Sev, Sew of the inverter 201 are equal to or smaller than the threshold, the inverter ECU 301 maintains this state. No great current flows to the switch unit which short-circuits and fails even thereafter.

When the inverter ECU 301 executes the above control, the current flowing through the switching elements 3a and 3b of any of the phases depends on the amount of electric charge of a smoothing capacitor C. As the rotational speed of the electric motor 101 which is rotated by the internal combustion engine 107 increases, the amount of electric charge accumulated in the smoothing capacitor C also increases.

Figure 7:
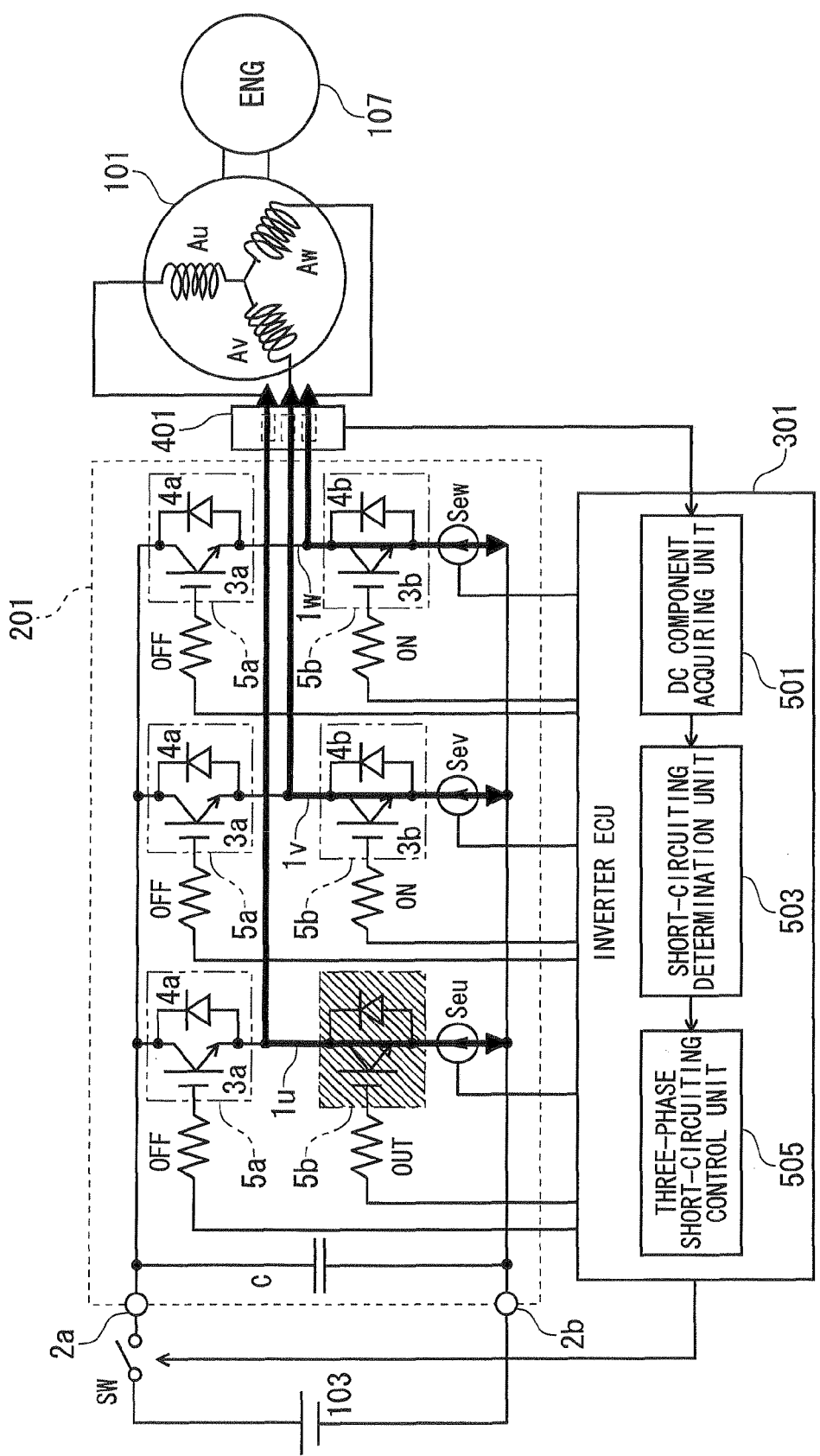
FIG. 7 shows flow lines of the phase currents when all switching elements 3b on negative side are on controlled, on the contrary to FIG. 6, with the switch unit 5b on the negative side of the U phase short-circuiting and failing.

As a result of the above control, when even any one of the currents detected by the current detection units Seu, Sev, Sew exceeds the threshold, the three-phase short-circuiting control unit 505 of the inverter ECU 301 off controls all the switching elements of the on-controlled side and on controls all the switching elements of the off-controlled side. Contrary to FIG. 6, FIG. 7 shows flow lines of phase currents when all the switching elements 3b on the negative side are on controlled with the switch unit 5b on the negative side of the U phase shirt-circuiting and failing. The inverter ECU 301 maintains this state.

Figure 8:
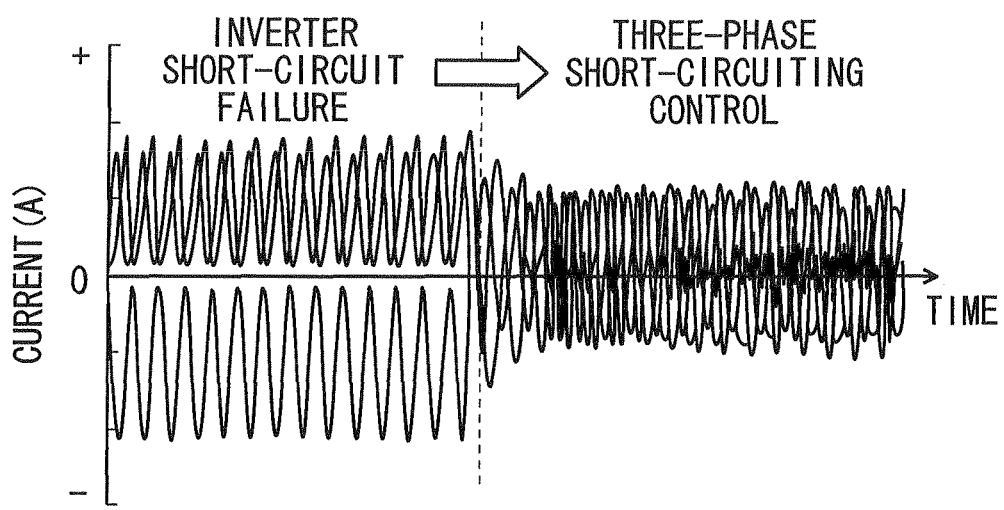
FIG. 8 shows phase currents flowing when an inverter ECU 301 executes the three-phase short-circuiting control when the inverter 201 short-circuits and fails.

By the inverter ECU 301 executing the three-phase short-circuiting control described above after the detection of the short-circuit failure of the inverter 201 by the inverter ECU 301, all the phase currents take waveforms centered at OA as shown in FIG. 8.

Figure 9:
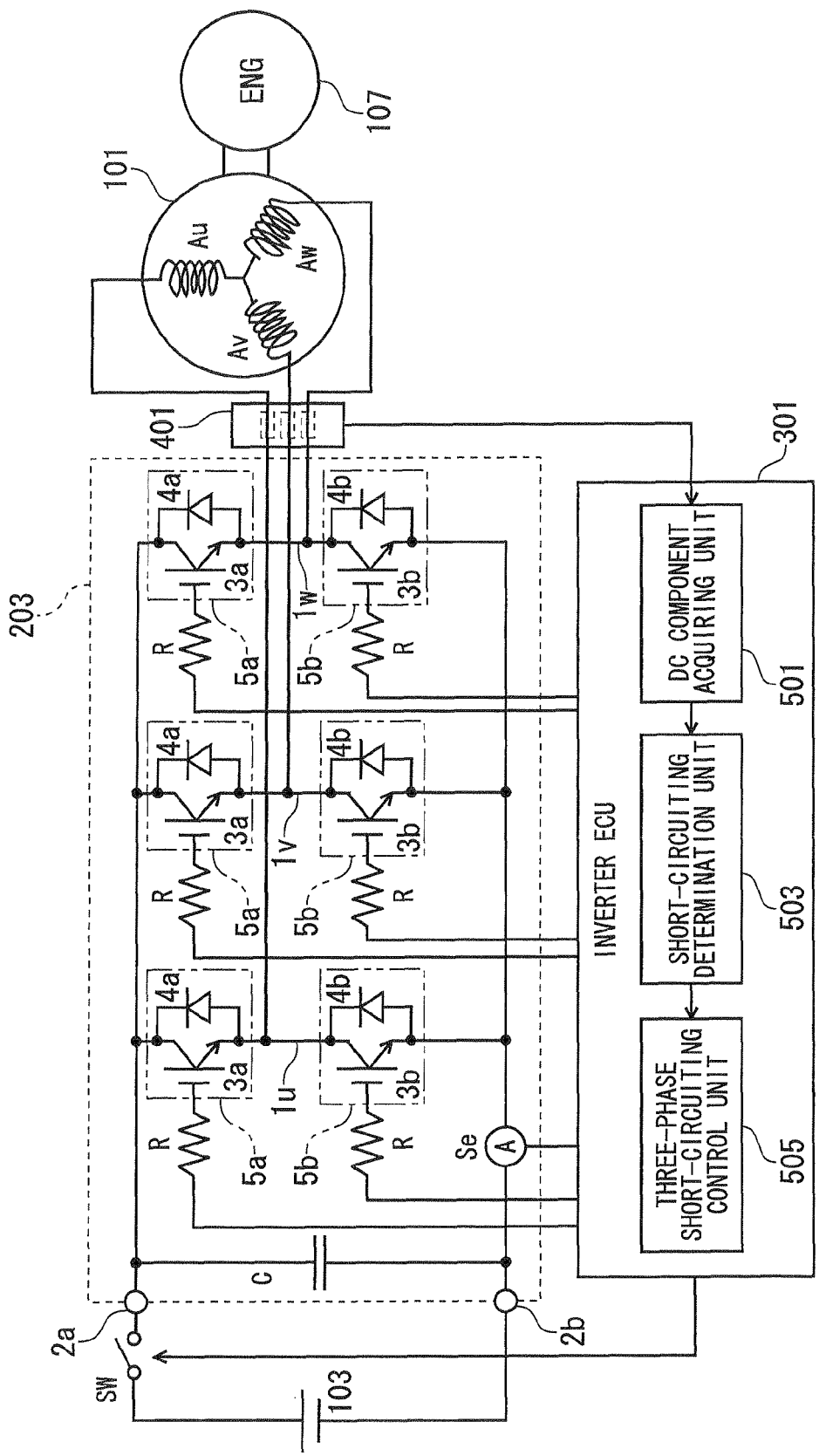
FIG. 9 is a block diagram of a system for driving the electric motor 101 which includes an inverter 203 of another form.

In place of the current detection units Seu, Sev, Sew, as shown in FIG. 9, a current detection unit Se may be provided between all switch units 5b provided on a negative side and a smoothing capacitor C. As this occurs, when a current detected by the electric current detection unit Se is equal to or smaller than the threshold when the three-phase short-circuiting control unit 505 of the inverter ECU 301 on controls all switching elements on either of the positive side and the negative side of an inverter 203, the inverter ECU 301 maintains that state. However, when the electric current detected by the electric current detection unit Se exceeds the threshold, as described before, the three-phase short-circuiting control unit 505 of the inverter ECU 301 off controls all the switching elements of the on-controlled side and on controls all the switching elements of the off-controlled side.

When switching element having a current detection function are used as switching elements 3a and 3b of each phase, in place of the current detection units Seu, Sev, Sew or the current detection unit Se, the respective current detection functions of the switching elements may be made used.

Figure 10:
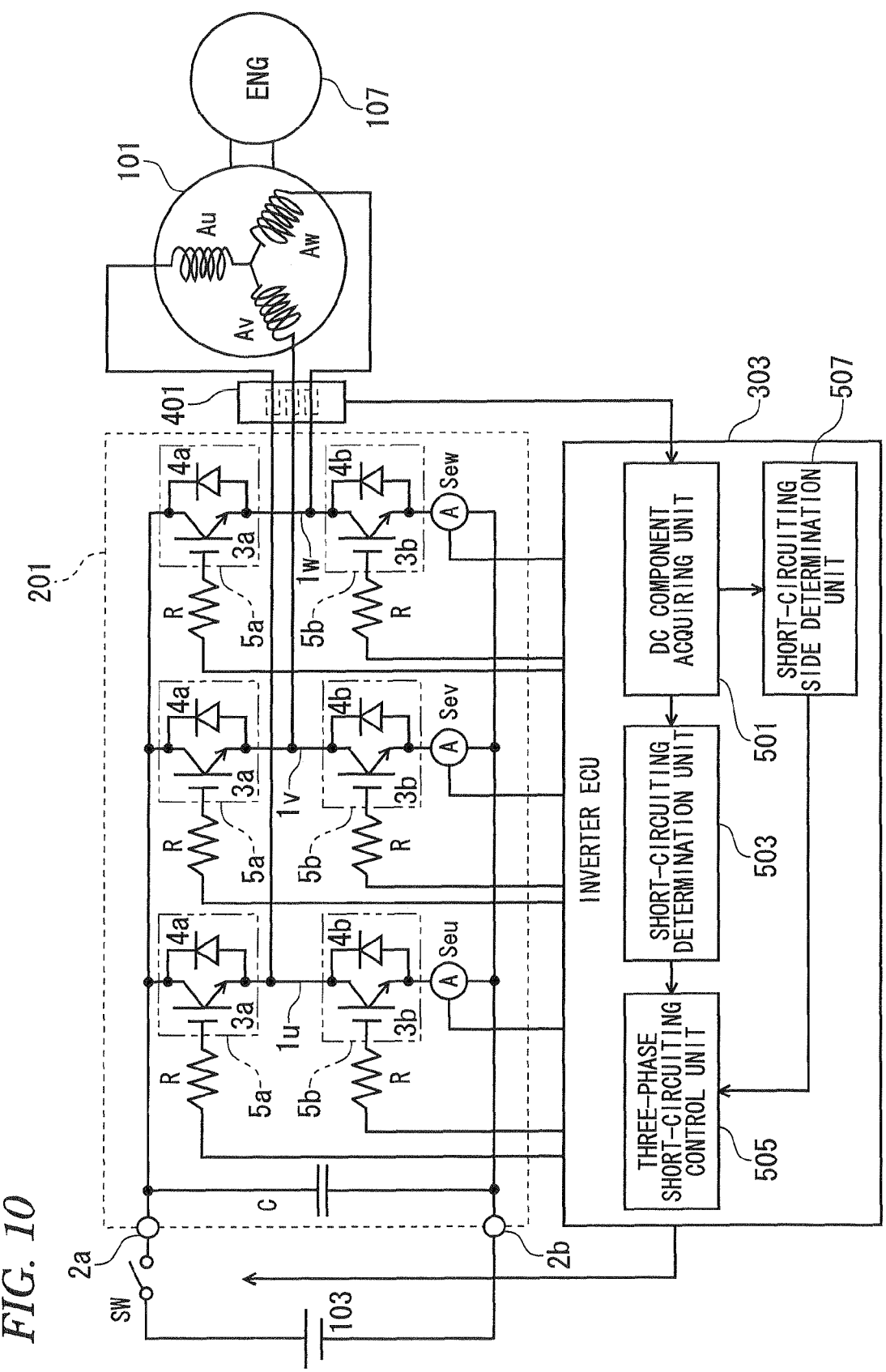
FIG. 10 is a block diagram of a system for driving the electric motor 101 which includes an inverter 303 of other form.

When detecting a shirt-circuit failure of the inverters 201, 203 based on respective characteristics of the current phases, the inverter ECU may determine whether the short-circuited switch unit lies on the positive side or the negative side. FIG. 10 is a block diagram showing a system for driving the electric motor 101 which includes an inverter ECU 303 having a short-circuiting side determination unit 507 for determining whether the short-circuited switch unit lies on the positive side or the negative side. As described above, signals indicating phase currents detected by the phase current sensor 401 are sent to the inverter ECU 303. The short-circuiting side determination unit 507 determines a side where the short-circuit failure of the switch unit occurs based on respective polarities of phase current values.

Figure 11:
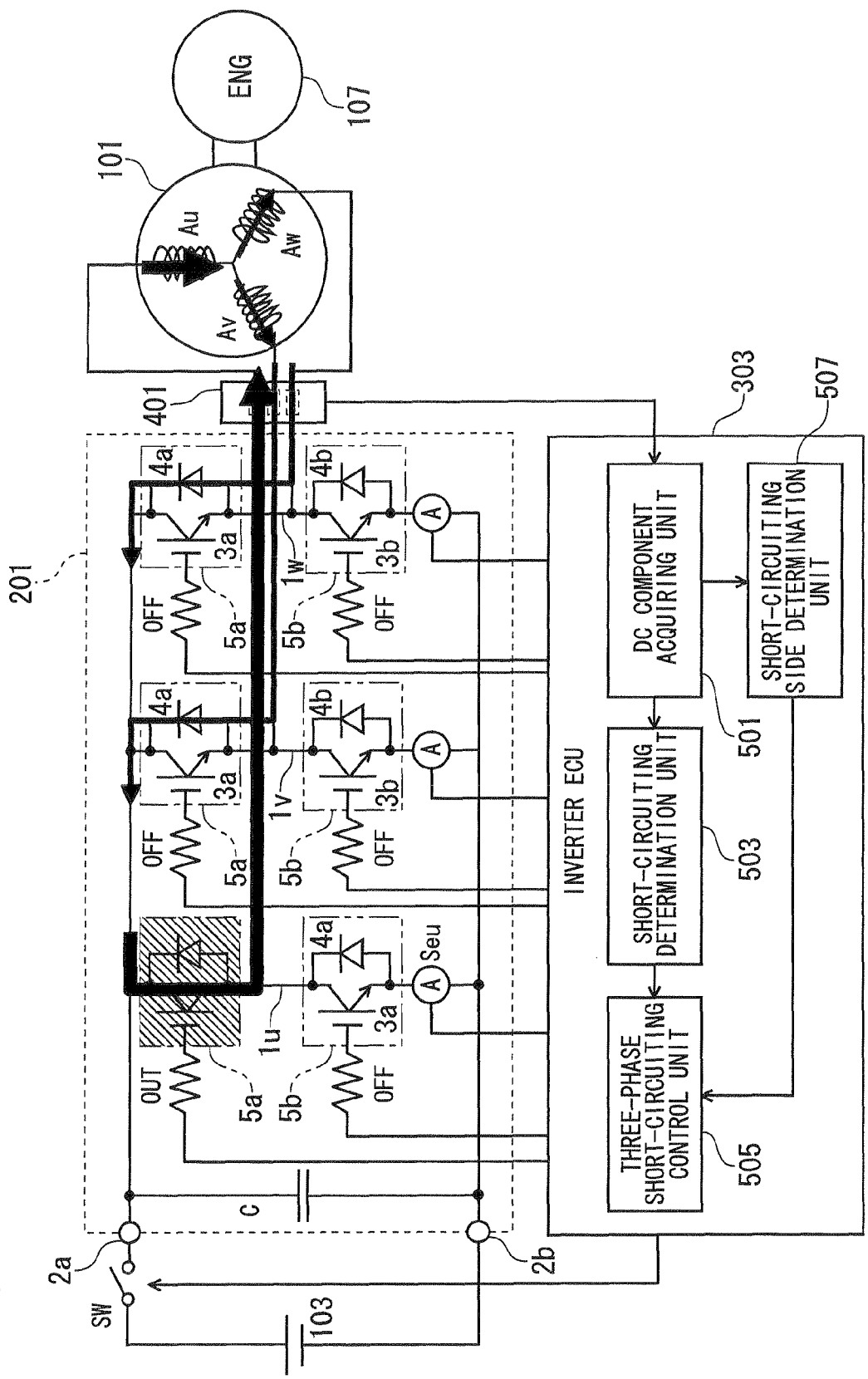
FIG. 11 shows flow lines, directions and magnitudes of respective phase currents which flow in the inverter 201 when a switch unit 5a provided on the positive side of the arm 1u short-circuits and fails while a back electromotive force is being generated in the electric motor 101.
Figure 12:
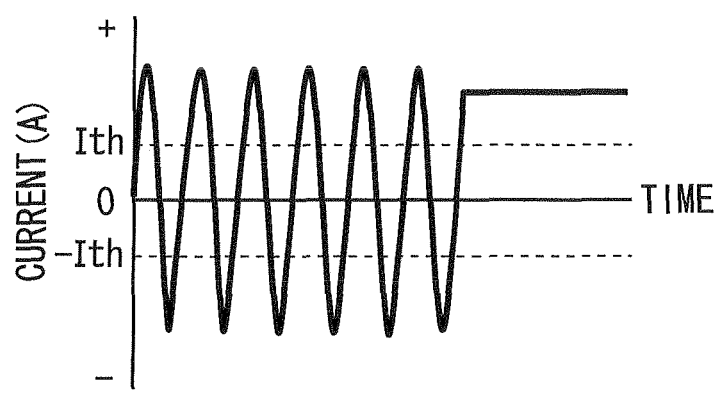
FIG. 12 shows a phase current when a phase current sensor 401 fails.

When the switch unit on the negative side short-circuits and fails, as shown in FIGS. 3 to 5, in the three phase currents, the two phase currents (V-phase current and W-phase current) take positive values, while the remaining one phase current (U-phase current) takes a negative value. On the contrary, when the switch unit on the positive side short-circuits and fails, as shown in FIG. 11, in the three phase currents, the two phase currents (V-phase current and W-phase current) takes negative values, while the remaining one phase current (U-phase current) takes a positive value. Consequently, the short-circuiting side determination unit 507 of the inverter ECU 303 determines the side where the short-circuit failure of the switch unit occurs based on whether the two phase currents having the same polarity take the positive or negative values.

When the short-circuiting side determination unit 507 of the inverter ECU 303 determines the side where the short-circuit failure of the switch unit occurs, three-phase short-circuiting control unit 505 of the inverter ECU 303 on controls the switching elements provided on the side where the short-circuit failure of the switch unit occurs and off controls the switching elements provided on the opposite side. As this occurs, no great current flows to the switch unit which short-circuits and fails. In this case, the three-phase short-circuiting control unit 505 of the inverter ECU 303 does not have to switch on/off controls of the switching elements based on the currents detected by the current detection units Seu, Sev, Sew or Se.

As described heretofore, according to the embodiment, when the vehicle runs only on the driving force from the internal combustion engine 107 and the control of the electric motor 101 is not performed at all, when the inverter 201, 203 short-circuits and fails, the inverter ECU 301, 303 detects the short-circuit failure based on the signals from the phase current sensor 401. Further, the inverter ECU 301, 303 on/off controls the switching elements of the inverter 201, 203 so that the three-phase short-circuited state is generated in the electric motor 101 without allowing a great current to flow to the switch unit which short-circuits and fails. In this way, according to the embodiment, even though the control of the electric motor 101 is stopped, the three-phase short-circuiting control can be performed by detecting the short-circuit failure of the inverter 201, 203.

(Second Embodiment)

When the phase current sensor 401 fails, the inverter ECUs 301, 303 of the first embodiment may not be able to detect the short-circuit failure of the inverters 201, 203 accurately. For example, when a failure occurs in the phase current sensor 401 in which phase currents detected by the phase current sensor 401 stay at larger values than the threshold Ith shown in FIG. 4, the inverter ECUs 301, 303 erroneously determines that a short-circuit failure is occurring in the inverters 201, 203.

The inverter ECUs 301, 303 of the above-described first embodiment determine that the inverters 201, 203 short-circuit and fail when at least one of the DC components of the three phase currents exceeds the threshold Ith in absolute value. However, an inverter ECU 305 of a second embodiment determines that the inverters 201, 203 short-circuit and fail by verifying to which of cases below the result of a comparison of the DC components of the three phase currents with the threshold Ith corresponds.

Case 1: All the DC components of the three phase currents exceed the threshold Ith in absolute value.

Case 2: Among the DC components of the three phase currents, two exceed the threshold Ith in absolute value, while the remaining one is equal to or smaller than the threshold Ith.

Case 3: Among the DC components of the three phase currents, one exceeds the threshold Ith in absolute value, while the remaining two are equal to or smaller than the threshold Ith.

When the comparison result corresponds to Case 1, the inverter ECU 305 determines that the phase current sensor 401 functions normal and the short-circuit failure is occurring in the inverters 201, 203. Thereafter, as in the first embodiment, the inverter ECU 305 executes the three-phase short-circuiting control on the electric motor 101.

When the comparison result corresponds to Case 2, the inverter ECU 305 determines that the short-circuit failure is occurring in the inverters 201, 203. As this occurs, the inverter ECU 305 determines that although the short-circuit failure is occurring in the inverters 201, 203, one of the three values is equal to or smaller than the threshold Ith in absolute value due to one of the sensors making up the phase current sensor 401 failing. In addition, in such a case, although there is a possibility that two of the three sensors making up the phase current sensor 401 fail, determining that the short-circuit failure is occurring in the inverters 201, 203, the inverter ECU 305 executes the three-phase short-circuiting control on the electric motor 101.

When the comparison result corresponds to Case 3, the inverter ECU 305 determines that no short-circuit failure is occurring in the inverters 201, 203. As this occurs, the inverter ECU 305 determines that one of the three values exceeds the threshold Ith in absolute value due to one of the sensors making up the phase current sensor 401 failing.

The inverter ECU 305 of this embodiment determines whether or not the inverters 201, 203 short-circuit and fail in view of the conditions of the phase current sensor 401, and therefore, the inverter ECU 305 can detect the short-circuit failure of the inverters 201, 203 more accurately.

Figure 13:
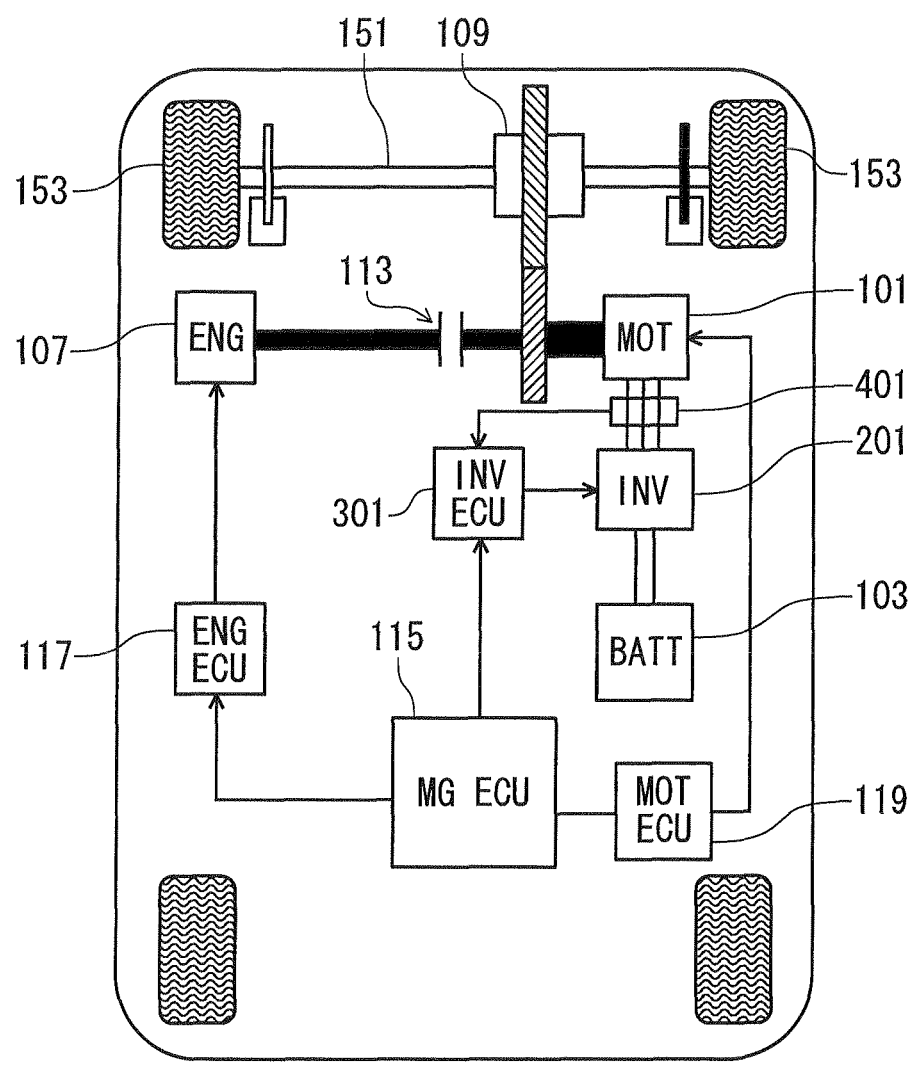
FIG. 13 is a block diagram showing an internal configuration of an HEV of another form.

In the vehicle of the embodiment shown in FIG. 1, the rotor of the electric motor 101 is connected directly to the drive shaft of the internal combustion engine 107. However, the invention may be applied to a vehicle as shown in FIG. 13 in which a drive shaft of an internal combustion engine 107 is connected to a gearbox 109 and a drive shaft 151 via a clutch 113 and a drive shaft of an electric motor 101 is connected to the gearbox 109 and the drive shaft 151 without interposing the clutch therebetween.

While the specific embodiments are exemplified, the skilled person in the art can variously alter or modify these embodiments without departing from the spirit and scope of the invention.

This patent application is based on Japanese Patent Application No. 2008-333639 filed on Dec. 26, 2008, the contents of which are to be incorporated herein by reference.

Description Of Reference Numerals And Characters

101 Electric motor (MOT); 103 Battery (BAT); 107 Internal combustion engine (ENG); 109 Gearbox; 113 Clutch; 115 Management ECU (MG ECU); 117 Engine ECU (ENG ECU); 119 Motor ECU (MOT ECU); 151 Drive shaft; 153 Drive wheel; 201, 203 Inverter (INV); 301, 303, 305 Inverter ECU (INV ECU); 401 Phase current sensor; 501 DC component acquiring unit; 503 Short-circuiting determination unit; 505 Three-phase short-circuiting control unit; 507 Short-circuiting side determination unit; SW Contactor; C Smoothing capacitor; 1u, 1v, 1w Arm; 3a, 3b Switching element; 4a, 4b Reflux diode; 5a, 5 Switch unit; Seu, Sev, Sew Current detection unit.

The invention claimed is:

1. A control system for an electric motor to which electric power is supplied from a DC power supply via a three-phase inverter, the three-phase inverter including switch units respectively provided on a positive side and a negative side of arms corresponding to respective phases, each switch unit including a switching element and a reflux diode connected in parallel thereto, comprising:

a phase current detection unit including three sensors for detecting phase currents which flow between the inverter and the electric motor;

a DC component acquiring unit for acquiring DC components of the respective phase currents; and a short-circuiting determination unit for determining that a short-circuit failure occurs in the inverter when at least two of the DC components of the three phase currents acquired by the DC component acquiring unit exceeds a threshold, wherein the short-circuiting determination unit determines that the short-circuit failure occurs in the inverter when all the DC components of the three phase currents exceed the threshold, and determines not only that the short-circuit failure occurs in the inverter but also that one of the sensors making up the phase current detection unit fails when two of the DC components of the three phase currents exceed the threshold.

2. The system of claim 1, further comprising:

a switch control unit for on controlling all of switching elements provided on either of the positive side and the negative side and off controlling all of switching elements provided on the opposite side, among the switching elements included in the inverter.

3. The system of claim 2, further comprising:

a current detection unit for detecting a current which flows to the two switching elements provided on the positive side and the negative side of each phase, wherein, when a current value detected by the current detection unit is equal to or greater than a threshold, the switch control unit off controls all the switching elements of the on-controlled side and on controls all the switching elements of the off-controlled side.

* * * * *